United States Patent [19]

Satoh

[11] 4,328,617
[45] May 11, 1982

[54] SAFETY BRAKE MECHANISM FOR POWER CHAIN SAWS

[75] Inventor: Masatoshi Satoh, Tokyo, Japan

[73] Assignee: Kioritz Corporation, Tokyo, Japan

[21] Appl. No.: 262,644

[22] Filed: May 11, 1981

[30] Foreign Application Priority Data

May 12, 1980 [JP] Japan .............................. 55-64857[U]

[51] Int. Cl.³ .............................................. B27B 17/00
[52] U.S. Cl. ........................................ 30/382; 30/383; 188/166
[58] Field of Search .................. 30/381, 382, 383, 385, 30/386, 387; 188/166

[56] References Cited

U.S. PATENT DOCUMENTS

| | | | |
|---|---|---|---|
| 3,839,795 | 10/1974 | Dooley | 30/383 |
| 3,923,126 | 1/1976 | Bidanset | 30/381 |
| 3,934,345 | 1/1976 | Hirschkoff | 30/383 |
| 3,964,333 | 6/1976 | Hirschkoff | 30/381 |
| 3,991,469 | 11/1976 | Frederickson | 30/381 |
| 4,059,895 | 11/1977 | Hirschkoff | 30/382 |
| 4,197,640 | 4/1980 | Murray | 30/382 |
| 4,246,701 | 1/1981 | Johansson | 30/382 |

Primary Examiner—Jimmy C. Peters
Attorney, Agent, or Firm—Fleit & Jacobson

[57] ABSTRACT

A chain saw safety brake mechanism includes an actuating drum rotatably disposed around the periphery of a clutch drum and a brake band wound around the clutch drum at least one convolution and hooked at one of its ends its other actuating drum and attached to the other end to a chain saw body. A spring is provided for turning the actuating drum from its ready position to a brake actuating position in which the brake band is tightened around the clutch drum to arrest its rotation. A reset lever is provided on the actuating drum to turn it to the ready position thereby producing a spring force in the spring.

2 Claims, 4 Drawing Figures

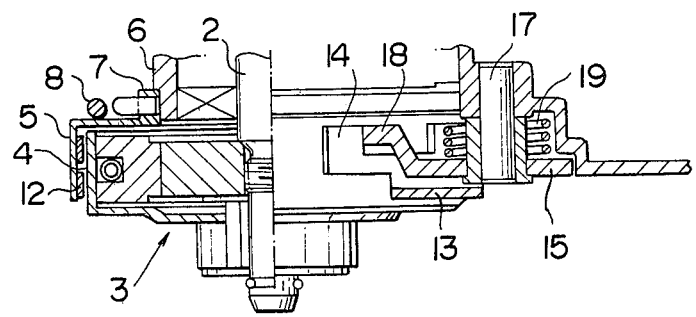
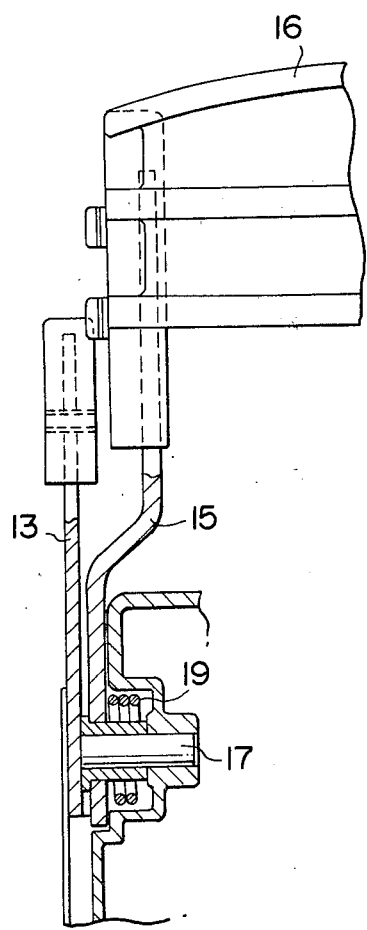
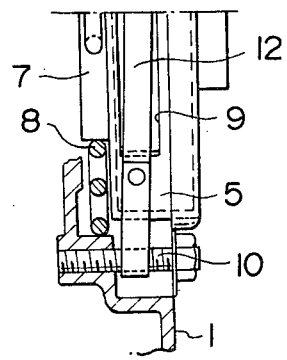

SAFETY BRAKE MECHANISM FOR POWER CHAIN SAWS

The present invention relates to a safety brake mechanism for power chain saws.

It has become increasingly important to protect chain saw operators from injuries resulting from "kickbacks" of chain saws or from situations where operators lose their grip on chain saw handles such that their hands are brought into engagement with saw chain.

Several techniques have been developed hitherto in an endeavor to improve chain saw safety and protect operators from injuries. Such techniques have been mainly intended to provide safety brake mechanisms wherein safety brakes for chain saws can be operated in an extremely rapid manner in the above-mentioned situations. However, all these mechanisms has disadvantages that they are complicated in construction.

Accordingly, it is a main object of the present invention to provide a chain saw safety brake mechanism which can accomplish a rapid braking action with an extremely simple arrangement.

This object is achieved, in accordance with the present invention, by providing a chain saw safety brake mechanism comprising a centrifugal clutch drum mounted on one of the sides of a chain saw body and operatively associated with a power transmission system for a saw chain, an actuating drum rotatably disposed around the periphery of the clutch drum, a brake band wound around the clutch drum at least one convolution and hooked at one of its ends to the actuating drum and attached at the other end to the chain saw body, spring means for turning the actuating drum clockwise a brake actuating position in which the brake band is tightened around the clutch drum, a reset lever on the actuating drum for manually turning the actuating drum counterclockwise against the action of the spring means to a ready position to produce a spring force in the spring means and to release tension in the brake band, a projection on the actuating drum, a safety lever pivoted to the chain saw body and spring biased counterclockwise around an axis of said pivot and a pawl on said safety lever for engaging said projection on the actuating drum to hold the actuating drum in its ready position when the actuating drum is turned counterclockwise by the aid of the reset lever. Assuming that for some reason, the hand of an operator strikes against the safety lever during operation of the chain saw, the safety lever will be pivoted clockwise resulting in disengagement of the pawl from the projection. Thus, the actuating drum is quickly turned clockwise under the action of the spring to tighten the brake band around the clutch drum and to bring the brake band into frictional contact with the peripheral surface of the clutch drum thereby quickly arresting rotation of the clutch drum. Release of braking action against the clutch drum is achieved by manually turning the actuating drum counterclockwise against the action of the spring with the aid of the reset lever until the projection on the actuating drum engages the pawl on the safety lever. During the rotation of the actuating drum in the counterclockwise direction, a spring force in the spring means is automatically produced as a source of power for the actuating drum.

The present invention will become apparent from the following description made on a preferred embodiment thereof shown in the accompanying drawings.

FIG. 2 is a fragmentary sectional plan view of the safety brake mechanism shown in FIG. 1;

FIG. 3 is a front elevational view of a safety lever and a reset lever shown in partial section; and FIG. 4 is a fragmentary sectional view of the safety brake mechanism as viewed in a direction of arrow A of FIG. 1.

Figure 1:
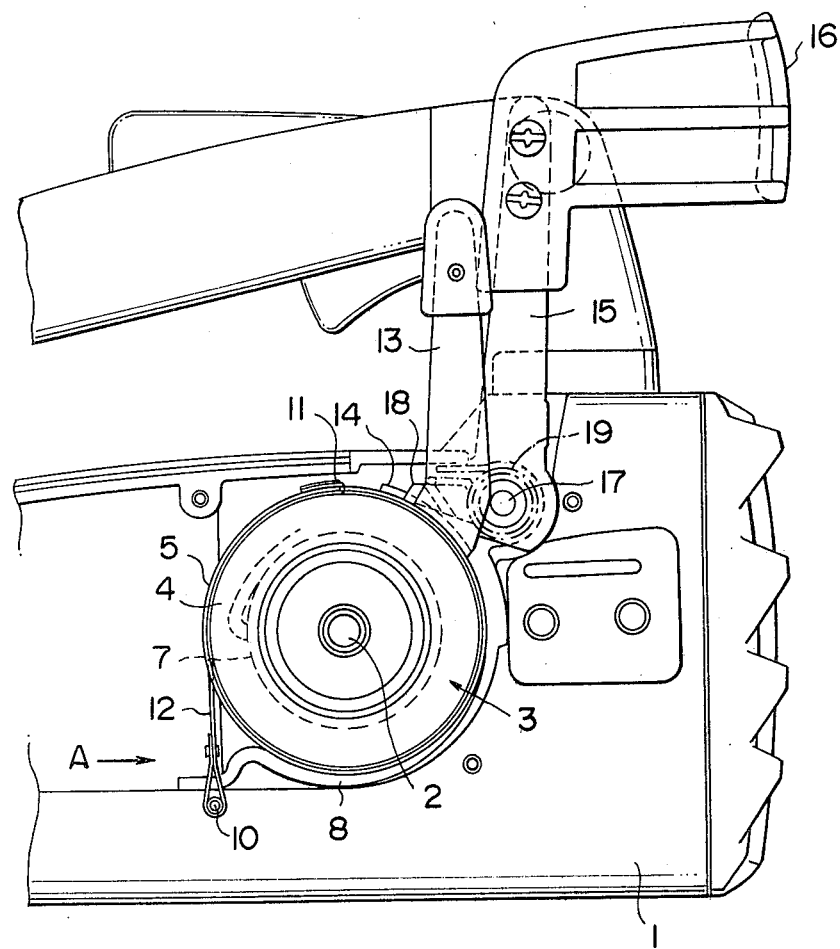
FIG. 1 is a fragmentary side elevational view of a chain saw having a safety brake mechanism incorporated therein in accordance with the present invention.

Referring to FIG. 1 of the drawings, a chain saw comprises a chain saw body 1 and an output shaft 2 extending laterally of the body 1. A centrifugal clutch 3 is mounted on the output shaft 2 and operatively associated with a power transmission system for a saw chain. The centrifugal clutch 3 includes a clutch drum 4 around which a cup-shaped actuating drum 5 is rotatably disposed coaxially with the clutch drum 4. The actuating drum 5 is provided with a coaxial cylindrical portion 7 which is journaled on a boss 6 formed integrally with the body. A coil spring 8 is disposed around the cylindrical portion 7 adjacent the inner surface of the actuating drum 5 and one end of the coil spring 8 is supported on the body and the other end of the spring is secured to the cylindrical portion 7 of the actuating drum 5. Thus, a spring force can be produced in the spring by turning the actuating drum 5 counterclockwise to a ready position.

A brake band 12 is wound around the actuating drum 5 one convolution. One of the ends of the brake band 12 is hooked at 11 to the actuating drum 5 and the other end of the brake band 12 extends out of the actuating drum 5 through the slot 9 formed in a portion of the periphery of the actuating drum 5 and is attached at 10 to the chain saw body. The brake band 12 is of such a length that it is loosened from the clutch drum when the actuating drum 5 is turned counterclockwise to the ready position. An outwardly extending reset lever 13 is secured to the actuating drum 5 and serves to manually turn it counterclockwise to the ready position. The actuating drum 5 is provided with a projection 14 adjacent the reset lever 13. Preferably, the projection 14 is formed as a piece integral with the reset lever 13 as shown in FIG. 1.

A safety lever 15 is provided at its upper end with a bar 16 extending transversely of the chain saw body 1 and pivotably mounted on the chain saw body 1 by means of a pivot pin 17. The safety lever 15 is also provided at its lower end with a rearward directed pawl 18 adapted to cooperate with the projection 14 on the actuating drum 5. A coil spring 19 is disposed around the pivot pin 17 and has ends bearing against the chain saw body 1 and the pawl 18, respectively to pivot the safety lever 15 counterclockwise around the pivot pin 17 with a spring force in the coil spring 19.

The coil spring 8 is brought to a compressed position by manually turning the actuating drum 5 counterclockwise with the aid of the reset lever 13 until the projection 14 engages the pawl 18 on the safety lever 15 and the compressed spring 8 tends to turn the actuating drum 5 clockwise, but engagement of the projection 14 with the pawl 18 on the safety lever 15 prevents the actuating drum 5 from turning clockwise.

During a kickback of the chain saw or when the operator's hand slips off of a handle (not shown), the hand will strike against the bar 16 of the safety lever 15 so that it is pivoted clockwise around the pivot pin 17 resulting in disengagement of the pawl 18 from the projection 14 on the actuating drum 5. The actuating drum 5 is quickly turned clockwise under the action of the compressed coil spring 8 from the ready position to a brake actuating position to tighten the brake band 12 around the clutch drum 4 thereby bringing the brake band 12 into frictional contact with the peripheral surface of the clutch drum 4 and arresting its rotation.

The braking of the clutch drum 4 by the brake band is released by manually turning the actuating drum 5 against the action of the extended coil spring 8 with the aid of the reset lever 13 until the projection 14 on the actuating drum 5 engages the pawl 18 on the safety lever 15 which is pivoted counterclockwise around the pivot pin 17 under the action of the coil spring 19. In other words, the rotation of the actuating drum 5 in the counterclockwise direction causes the brake band 12 to be brought to its loose position thereby losing the braking action.

It will be recognized from the foregoing that since the brake band is tightened around the clutch drum by the actuating drum turned with a spring force when the safety lever is swung clockwise, the clutch drum can be braked with a high frictional force and extremely high reliability. A release of the braking only requires that the actuating drum is manually turned from the brake actuating position to the ready position by the reset lever, and therefore, the reset operation for the safety brake mechanism is very easy. Furthermore, it will be noted that the actuating drum which is turned to produce the spring force is kept in the reset position or ready position by simplified means including a projection thereon cooperating with a pawl movable with the safety lever.

I claim:

1. A safety brake mechanism for power chain saws comprising a chain saw body, a centrifugal clutch having a drum mounted laterally of the chain saw body and operatively associated with a power transmission system for a saw chain, an actuating drum rotatably disposed around the periphery of said clutch drum, a brake band wound around said clutch drum at least one convolution and hooked at one of ends thereof to the actuating drum and attached at the other end to said chain saw body, spring means for turning said actuating drum clockwise a brake actuating position in which said brake band is tightened around said clutch drum, a reset lever on said actuating drum for manually turning said actuating drum counterclockwise against the action of said spring means to a ready position to produce a spring force in said spring means and to release tension in the brake band, a projection on said actuating drum, a safety lever pivoted to said chain saw body and spring urged counterclockwise around a axis of said pivot and a pawl on said safety lever for engaging said projection on said actuating drum to hold it in the ready position when said actuating drum is turned counterclockwise by the aid of said reset lever.

2. A safety brake mechanism for a power chain saw having a chain saw body, and a centrifugal clutch having a drum mounted laterally of the chain saw body and operatively associated with a power transmission system for a saw chain, said safety brake mechanism comprising: an actuating drum rotatably disposed around the periphery of said clutch drum; a brake band wound around said clutch drum at least one convolution and hooked at one of its ends to the actuating drum and attached at its other end to said chain saw body; spring means for turning said actuating drum in a first direction into a brake actuating position in which said brake band is tightened around said clutch drum; reset means on said actuating drum for turning said actuating drum in a direction against the action of said spring means to a ready position thereby to produce a spring force in said spring means and to release tension in the brake band; a projection on said actuating drum; a safety lever pivoted to said chain saw body; a spring for urging said safety lever around an axis of its pivot into a ready position corresponding to the ready position of the reset means; and a pawl on said safety lever for engaging said projection on said actuating drum to hold said actuating drum in its ready position when said actuating drum in turned by the aid of said reset means whereby movement of the safety lever from its ready position releases said actuating drum so that said actuating drum is rotated by said spring means into the brake actuating position.

* * * * *